(12) United States Patent
Kasefang et al.

(10) Patent No.: US 11,742,791 B2
(45) Date of Patent: Aug. 29, 2023

(54) MOBILE GENERATOR

(71) Applicant: Sesame Solar, Inc., Jackson, MI (US)

(72) Inventors: Adam Kasefang, Addison, MI (US);
Namit Jhanwar, Northville, MI (US)

(73) Assignee: Sesame Solar, Inc., Jackson, MI (US)

( * ) Notice: Subject to any disclaimer, the term of this patent is extended or adjusted under 35 U.S.C. 154(b) by 0 days.

(21) Appl. No.: 17/876,972

(22) Filed: Jul. 29, 2022

(65) Prior Publication Data

US 2023/0055234 A1     Feb. 23, 2023

Related U.S. Application Data

(63) Continuation of application No. 17/137,660, filed on Dec. 30, 2020, now Pat. No. 11,404,995.

(60) Provisional application No. 62/955,508, filed on Dec. 31, 2019.

(51) Int. Cl.
| | |
|---|---|
| *H02S 10/40* | (2014.01) |
| *B62D 63/08* | (2006.01) |
| *H02S 20/30* | (2014.01) |
| *B60P 3/025* | (2006.01) |
| *B60P 3/14* | (2006.01) |
| *B60P 3/20* | (2006.01) |

(52) U.S. Cl.
CPC .............. *H02S 10/40* (2014.12); *B62D 63/08* (2013.01); *H02S 20/30* (2014.12); *B60P 3/0257* (2013.01); *B60P 3/14* (2013.01); *B60P 3/20* (2013.01)

(58) Field of Classification Search
CPC ........ H02S 10/40; H02S 20/30; B60P 3/0257; B60P 3/14; B60P 3/20; B62D 63/08
See application file for complete search history.

(56) References Cited

U.S. PATENT DOCUMENTS

| | | |
|---|---|---|
| 9,917,471 B2 | 3/2018 | Wheatley et al. |
| 2004/0124711 A1 | 7/2004 | Muchow et al. |

*Primary Examiner* — Robert L Deberadinis
(74) *Attorney, Agent, or Firm* — Michael Best & Friedrich LLP

(57) ABSTRACT

A mobile generator includes a housing having a top portion, a first side portion, and a second side portion, wherein the first side portion includes an energy-receiving component. The mobile generator also includes an arm pivotally coupled to the housing at a first pivot point and to the first side portion at a second pivot point. A first motion controller is configured to drive rotation of the arm about the first pivot point, and a second motion controller configured to drive rotation of the first side portion about the second pivot point.

10 Claims, 8 Drawing Sheets

MOBILE GENERATOR

CROSS-REFERENCE TO RELATED APPLICATIONS

This application is a continuation of U.S. application Ser. No. 17/137,660, filed Dec. 30, 2020, and claims priority to U.S. Provisional Application No. 62/955,508, filed Dec. 31, 2019, the entire contents of each of which are incorporated herein by reference.

BACKGROUND

Deployment of generators, including those that rely on solar power to generate energy, is often a time consuming and labor-intensive task. Even setting up a small solar power generator may take between 2-30 days, requiring a group of skilled workers to construct and install the solar power generator before the solar power can be used to produce energy. Additionally, current generators do not provide standard interior solutions to use the energy generated by the generators.

SUMMARY

In accordance with some embodiments, a mobile generator includes a housing having a top portion, a first side portion, and a second side portion. The first side portion includes an energy-receiving component. The mobile generator further includes an arm pivotally coupled to the housing at a first pivot point and to the first side portion at a second pivot point. The mobile generator further includes a first motion controller that drives rotation of the arm about the first pivot point, and a second motion controller that drives rotation of the first side portion about the second pivot point.

Other aspects of the invention will become apparent by consideration of the detailed description and accompanying drawings.

DETAILED DESCRIPTION

Figure 1:
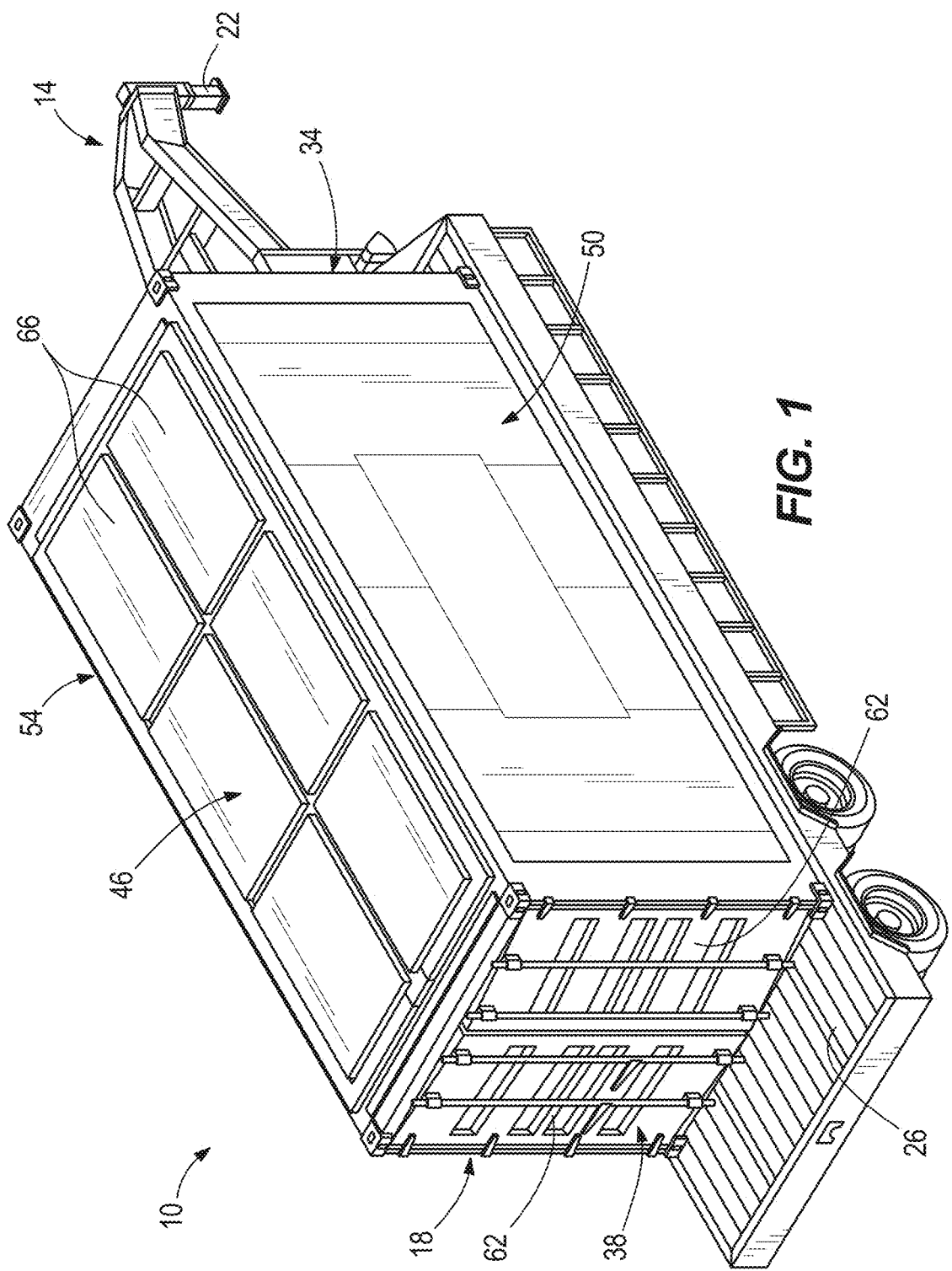
FIG. 1 is a perspective view of a mobile generator according to one embodiment, illustrating a fully stored state.

Before embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limited.

FIGS. 1-4 illustrate an exemplary embodiment of a mobile generator 10 having a trailer 14 and a housing 18 that is positioned on top of the trailer 14. The trailer 14 includes a hitch 22 that may be coupled to the back of a vehicle, and a wheeled flatbed 26 that extends behind the hitch 22. In other embodiments the trailer 14 may have shapes and sizes other than that illustrated (e.g., embodiments that include or do not include the hitch 22, and embodiments where the shape or size of the hitch 22 and/or flatbed 26 is different than that illustrated). In some embodiments, the trailer 14 is omitted entirely, and the mobile generator 10 may include only the housing 18 and its associated components. In such embodiments, the mobile generator(s) 10 may be transported and delivered on site (e.g., lifted and then lowered into place onto a ground surface as needed).

With continued reference to FIGS. 1-4, in the illustrated embodiment the housing 18 has a rectangular box-like structure, although other embodiments may include a square-shaped housing, a trapezoidal-shaped housing, or any other desired shape. As illustrated in FIGS. 1-4, the housing 18 defines an interior portion 30, and includes a front portion 34, a rear portion 38 disposed opposite the front portion 34, a bottom portion 42, a top portion 46 disposed opposite the bottom portion 42, a first side portion 50 coupled to the top portion 46, and a second side portion 54 coupled to the top portion 46. The housing 18 may be made partially or entirely from metal, stainless steel, carbon fiber, fiberglass, wood, plastics, synthetics, or other suitable materials.

Figure 2:
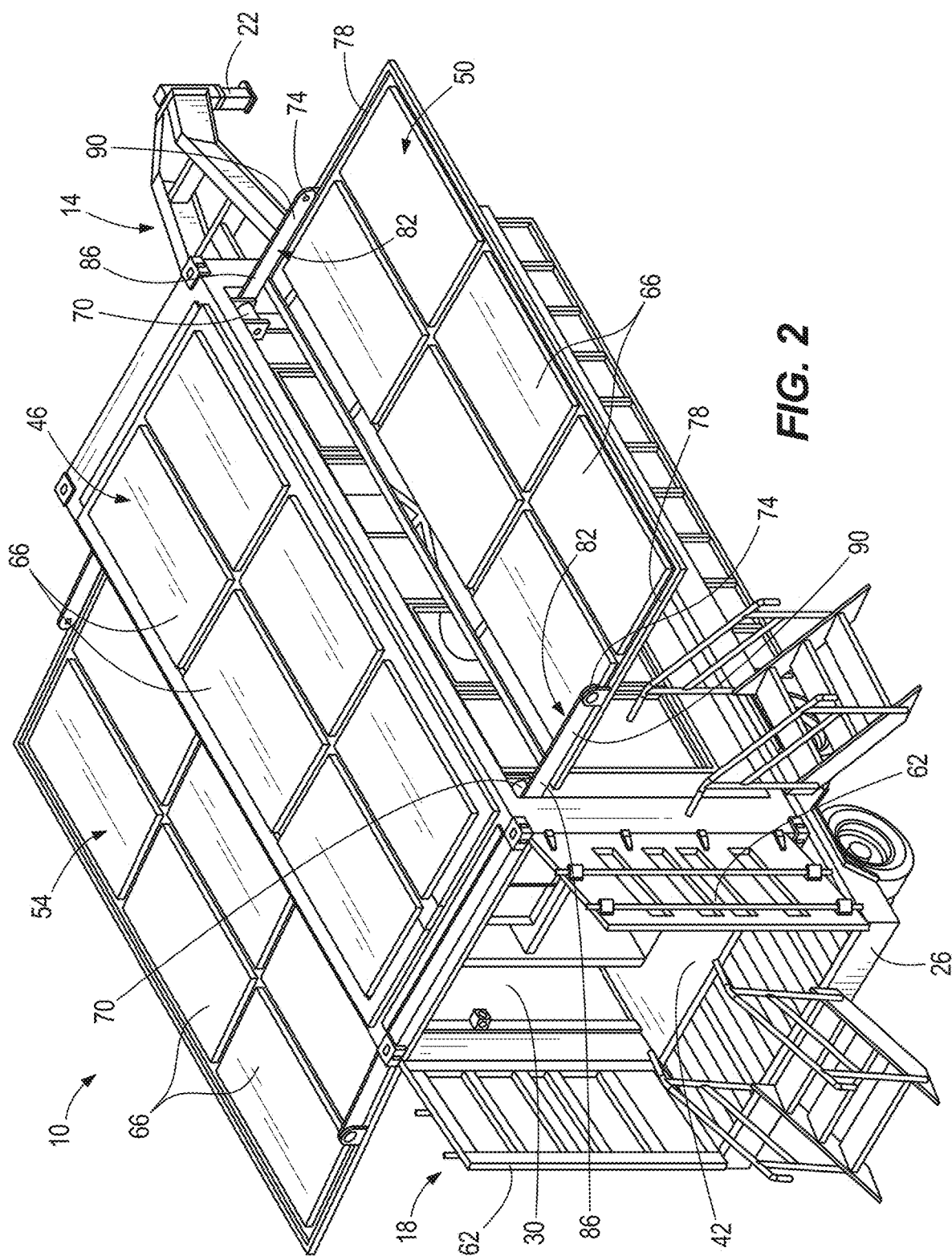
FIG. 2 is a perspective view of the mobile generator of FIG. 1, illustrating a fully deployed state.
Figure 3:
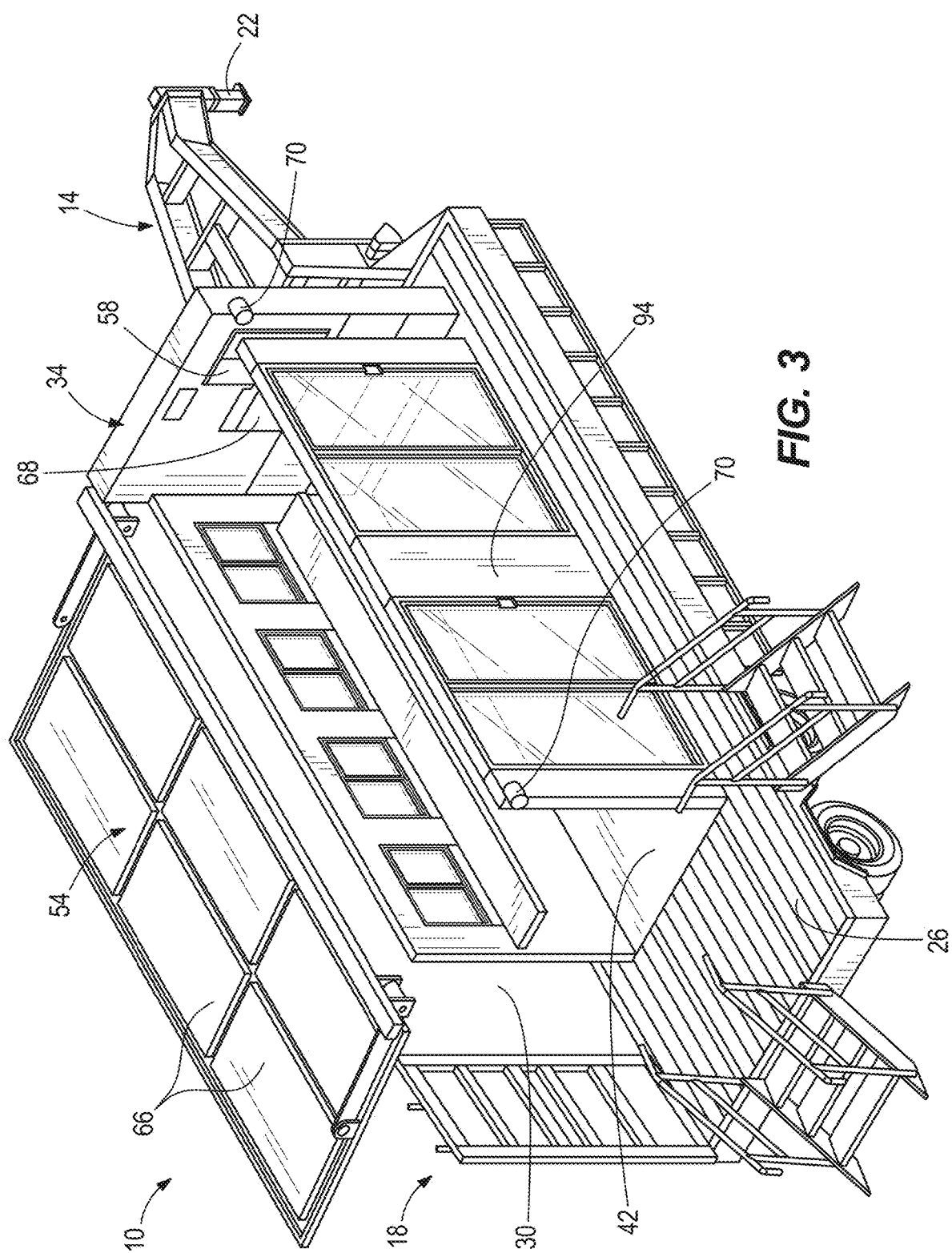
FIGS. 3 and 4 are perspective views of the mobile generator of FIG. 2, with portions removed to further illustrate the mobile generator.

In the illustrated embodiment the front portion 34 is a solid, stationary wall that includes at least one electronic component 58 (e.g., controller, circuitry, or other electronic component as seen in FIG. 3) facing the interior portion 30 of the housing 18. The rear portion 38 includes two pivotable doors 62 (FIG. 2) that open and close to expose and close off the interior portion 30. The bottom portion 42 (FIG. 3) is another solid, stationary wall, or floor, that rests for example upon and may be fastened to the wheeled flatbed 26. In some embodiments the bottom portion 42 is instead part of the wheeled flatbed 26 itself.

With continued reference to FIGS. 1-4, the mobile generator 10 includes at least one portion that is configured to receive energy from an external environment and to generate power and/or electricity from that energy. For example, in the illustrated embodiment the top portion 46, the first side portion 50, and the second side portion 54 are walls or framed structures that include one or more solar panels 66 or other energy-receiving components attached thereto that receive energy from the sun and convert the energy from the sun into electrical energy. The solar panels 66 may form a fully integrated array having an inverter, charge controller, solar combiner, battery storage, and electronics, making them fully operable upon opening. In some embodiments, the top portion 46, the first side portion 50, and/or the second side portion 54 include an assembly of metal tubes or bars that are covered with metal sheets. The solar panels 66 may be coupled to the metal tubes and/or metal sheets. The top portion 46, the first side portion 50, and the second side portion 54 may have various other shapes and sizes than that illustrated, and may be formed partially or entirely from a wall or walls, or a frame or frames.

With continued reference to FIGS. 1-4, the mobile generator 10 may include only a single portion (e.g., the first side portion 50) that receives energy, or only two portions (e.g., the first side portion 50 and the second side portion 54) that receive energy. In yet other embodiments the mobile generator 10 may include more than three portions that receive energy (e.g., the top portion 46, the first side portion 50, the second side portion 54, and one or more of the front and rear portions 34, 38). Other embodiments include different numbers and arrangements of energy-receiving portions than that illustrated.

While the illustrated embodiment uses solar panels 66 to collect energy from outside of the housing 18, in other embodiments one or more other energy-receiving components may be used. For example, the mobile generator 10 may include one or more wind-powered components on the top portion 46, the first side portion 50, and/or the second side portion 54 that receive energy from the wind and convert the energy into electricity. The mobile generator 10 may also or alternatively include one or more components that receive light energy, electromechanical energy, electromagnetic energy, infrared energy, and/or electrical energy.

The energy received by the energy-receiving components may be sent for example to the electronic component or components 58, and may be stored in the electronic component 58 or used immediately on-site to provide power and/or electricity. For example the electronic component 58 may use/transfer the energy from the solar panels into a voltage for use immediately on-site. In some embodiments, the interior portion 30 of the housing 18 includes equipment that is powered by the energy collected by the energy-receiving components. For example, the housing 18 may include equipment related to or forming part of an office, warehouse/storage, refrigerator, medical clinic, pharmacy, water filtration/pumping/air-to-water generation station, retail store, communication center, disaster preparation/recovery office, library, classroom, military equipment, or electrical vehicle (EV) charging station. In some embodiments the housing 18 additionally includes a wireless communications equipment 68 (FIGS. 3 and 4) that is connected to the electronic component 58 (e.g., to an electronic circuitry of the electronic component) for receiving and/or transmitting at least one wireless communication signal.

With continued reference to FIGS. 1-4, at least one of the energy-receiving portions is movable relative to the rest of the housing 18 between a fully stored state and a fully deployed state. In the fully stored state the energy-generating portion does not receive energy from outside the housing 18, whereas in the fully deployed state the energy-generating portion receives energy from outside the housing 18.

In the illustrated embodiment, the first side portion 50 and the second side portion 54 are each movable between a fully stored state (FIG. 1) and a fully deployed state (FIG. 2). As illustrated in FIG. 2, when the first side portion 50 and the second side portion 54 are in the fully deployed state the solar panels 66 are exposed to the environment, and thus to sunlight outside the housing 18. In contrast, and as illustrated in FIG. 1, when the first side portion and the second side portion 54 are in the fully stored state the solar panels 66 face the interior portion 30 of the housing 18, and thus do not collect any sunlight. In other embodiments the fully stored state may be a state where at least a portion of the first or second side portion 50, 54 is still exposed to sunlight and is collecting sunlight. In the illustrated embodiment, the top portion 46 continues to remain in a fully deployed state regardless of the positions of the first and second side portions 50, 54, although in other embodiments the top portion 46 may also be arranged to move between a fully stored state and a fully deployed state.

With continued reference to FIGS. 1-4, in the illustrated embodiment the first side portion 50 and the second side portion 54 each rotate about a plurality (e.g., two) separate sets of pivot points to move between the fully stored state and the fully deployed state. The movements of each of the first and second side portions 50, 54 are similar. Therefore, reference is made only to the first side portion 50.

Figure 4:
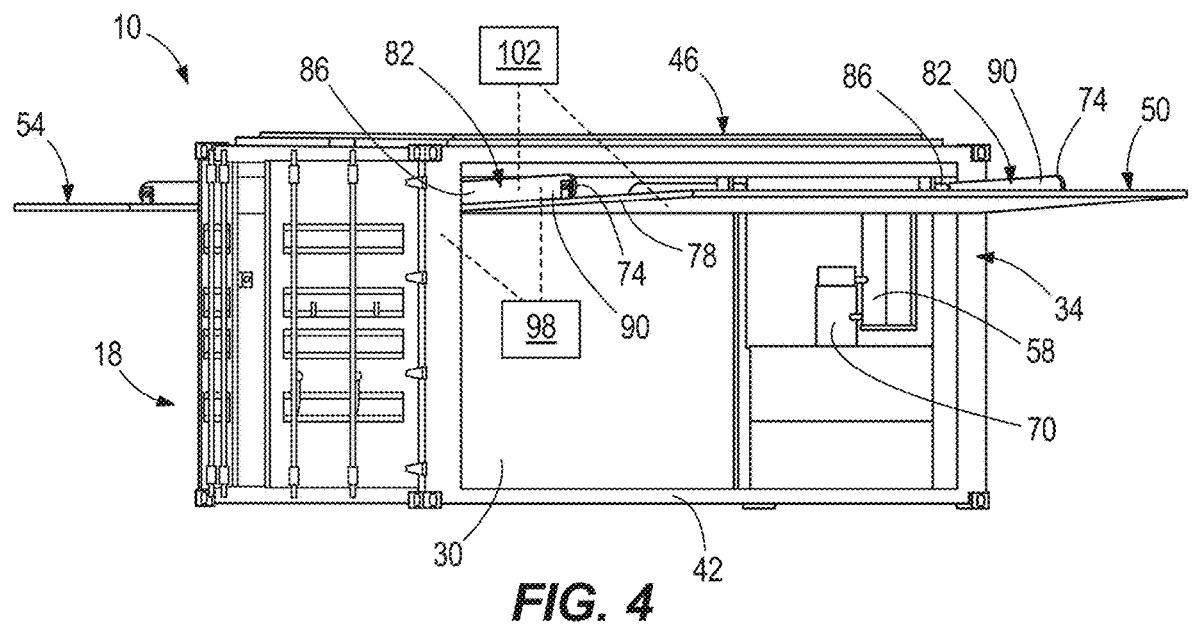

As illustrated in FIGS. 2-4, the housing 18 includes a first set of pivot points 70 generally located in upper corners of the housing 18, and the first side portion 50 includes a second set of pivot points 74 located generally centrally along side edges 78 of the first side portion 50. The mobile generator 10 further includes a set of arms 82 (e.g., T-joint metal arms) that are each rotatably coupled at a first end 86 to one of the pivot points 70 and at an opposite second end 90 to one of the pivot points 74.

As illustrated in FIG. 3, in some embodiments the housing 18 includes an internal wall 94 that includes one of the first set of pivot points 70, and the front portion 34 includes the other pivot point 70. Each of the pivot points 70 may be defined for example by a hinge structure (e.g., bearing) protruding from the internal wall 94 and front portion 34, respectively. In some embodiments the pivot points 70 are defined by one or more metal plates that are welded/bolted to the top portion 46 of the housing 18. The arms 82 may be rotatably coupled to the pivot points 70 via pins or other structures. For example, in some embodiments the first end 86 of each arm 82 may be installed by inserting a metal pin through the hinge structure of the pivot point 70, which allows it to pivot at the pivot point 70.

With reference to FIGS. 2 and 4, each of the second set of pivot points 74 may include for example a protruding hinge structure that extends from the side edge 78 of the first side portion 50. As with the first set of pivot points 70, the second set of pivot points 74 may include various types of hinges or hinge structures. The second ends 90 of the arms 82 may be rotatably coupled to the second set of pivot points 74, for example, via pins.

With reference to FIGS. 2-4, one or more motion controllers may be used to control the pivoting movement of the first side portion 50 about the pivot points 70, 74 (and/or control pivoting movement of the second side portion 54 about its corresponding pivot points). In some embodiments the motion controller or motion controllers include at least one of a hydraulic cylinder, rotary hydraulic actuator, hydraulic power unit, electronic actuator (linear or rotary), electric or manual winch, electric motor (e.g., powered by hydraulic power units or an electric source), chain, steel tubing, fitting, and/or sprocket. The electronic component 58 may include for example a controller that may be used and/or programmed to control the motion controllers. Alternatively, the motion controllers themselves may include one or more controllers (e.g., microcontrollers) that are used and/or programmed to control the motion controllers.

For example, and with reference to FIG. 4, in the illustrated embodiment the mobile generator 10 includes a first motion controller 98 (illustrated schematically) that is coupled to both the housing 18 (e.g., to a corner of the housing 18, to the front portion 34 or the rear portion 38, and/or to any other portion of the housing 18) as well as to one or more of the arms 82 that are coupled to the first side portion 50. When the mobile generator 10 is in the fully stored state as seen in FIG. 1 and the first motion controller 98 is activated, the arms 82 are pivoted about the first pivot points 70, and the first side portion 50 is generally raised (e.g., 90 degrees) away from the rest of the housing 18. In this position, the solar panels 66 are facing down toward the ground surface. In some embodiments the first motion controller 98 is coupled via a pin to the housing 18, allowing it to pivot with the pivoting motion of the arms 82.

With continued reference to FIG. 4, the mobile generator 10 may additionally include a second motion controller 102 that is coupled to one of the arms 82 as well as to the first side portion 50. When the second motion controller 102 is activated, the first side portion 50 is rotated (e.g., 180 degrees) about the second pivot points 74 relative to the arms 82, and into the position shown in FIG. 2 where the solar panels 66 are facing upwards toward the sunlight. In some embodiments the second motion controller 102 may be coupled via a pin to the arm 82, allowing it to pivot with the pivoting motion of the first side portion 50.

With reference to FIGS. 1-4, the activation of the first motion controller 98 and the second motion controller 102 may occur simultaneously, such that as the first side portion 50 is being pivoted and lifted by the first motion controller 98, the second motion controller 102 is also rotating the first side portion 50 about the second pivot points 74 so that the solar panels 66 face upwardly. In yet other embodiments the activation takes place sequentially, or with a pause or gap in time between the movements. Additionally, while a single first motion controller 98 and a single second motion controller 102 are illustrated schematically for the first side portion 50, in other embodiments the mobile generator 10 may include use of multiple first motion controllers 98 and/or second motion controllers 102 to move and pivot the first side portion 50. As described above, the second side portion 54 may be moved and pivoted in a similar manner to the first side portion 50, with its own associated motion controllers similar to the first motion controller 98 and the second motion controller 102. In some embodiments, the mobile generator 10 may include only a single first motion controller 98 that is coupled to both the first side portion 50 and the second side portion 54 to move each simultaneously.

Figure 5:
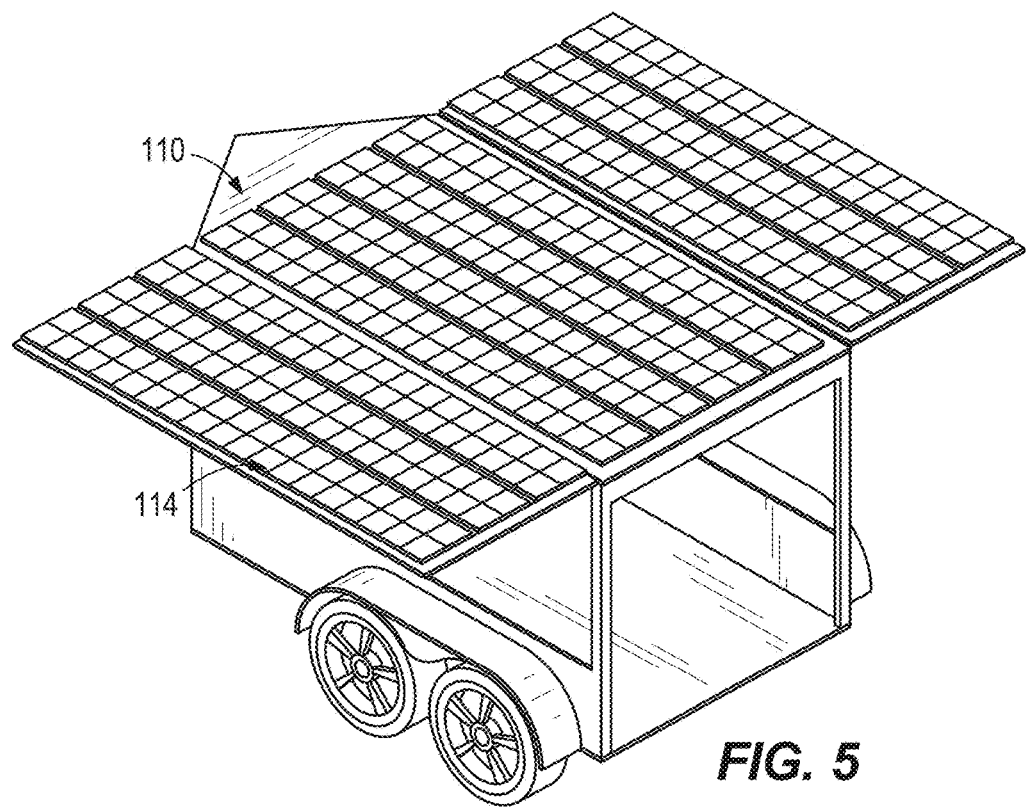
FIGS. 5 and 6 are perspective view of a mobile generator according to another embodiment.
Figure 6:
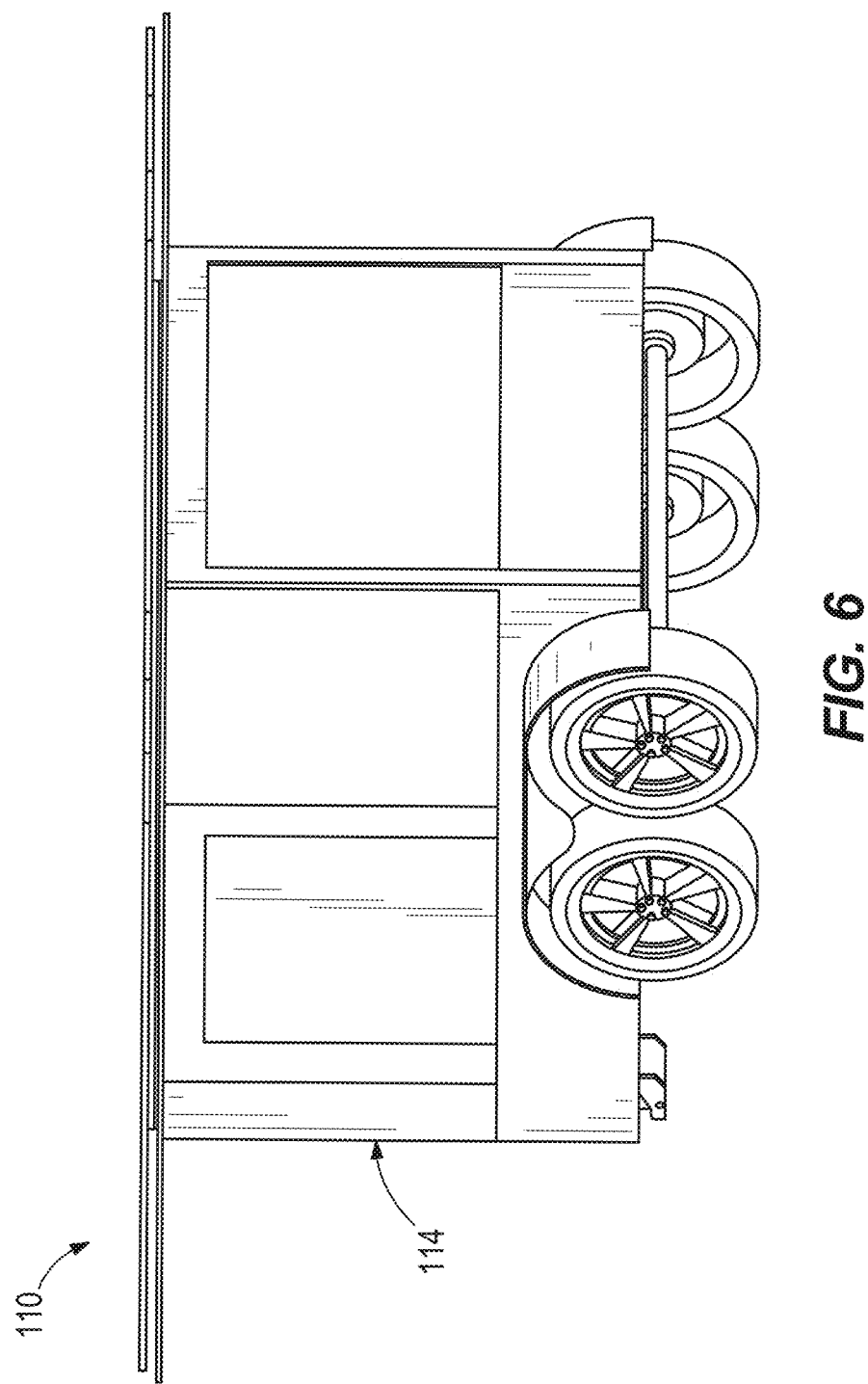
Figure 7:
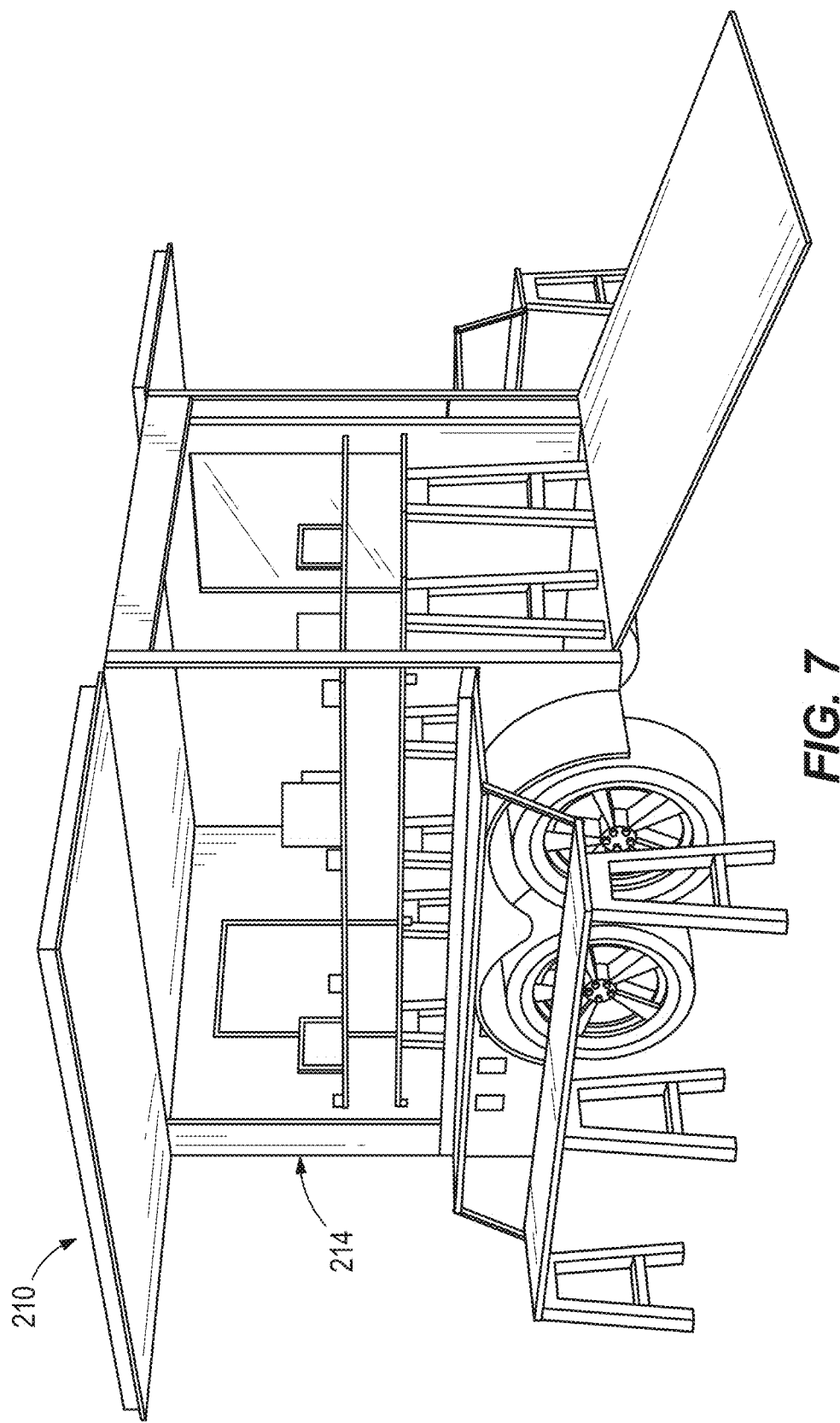
FIGS. 7-9 are perspective views of a mobile generator according to another embodiment.
Figure 8:
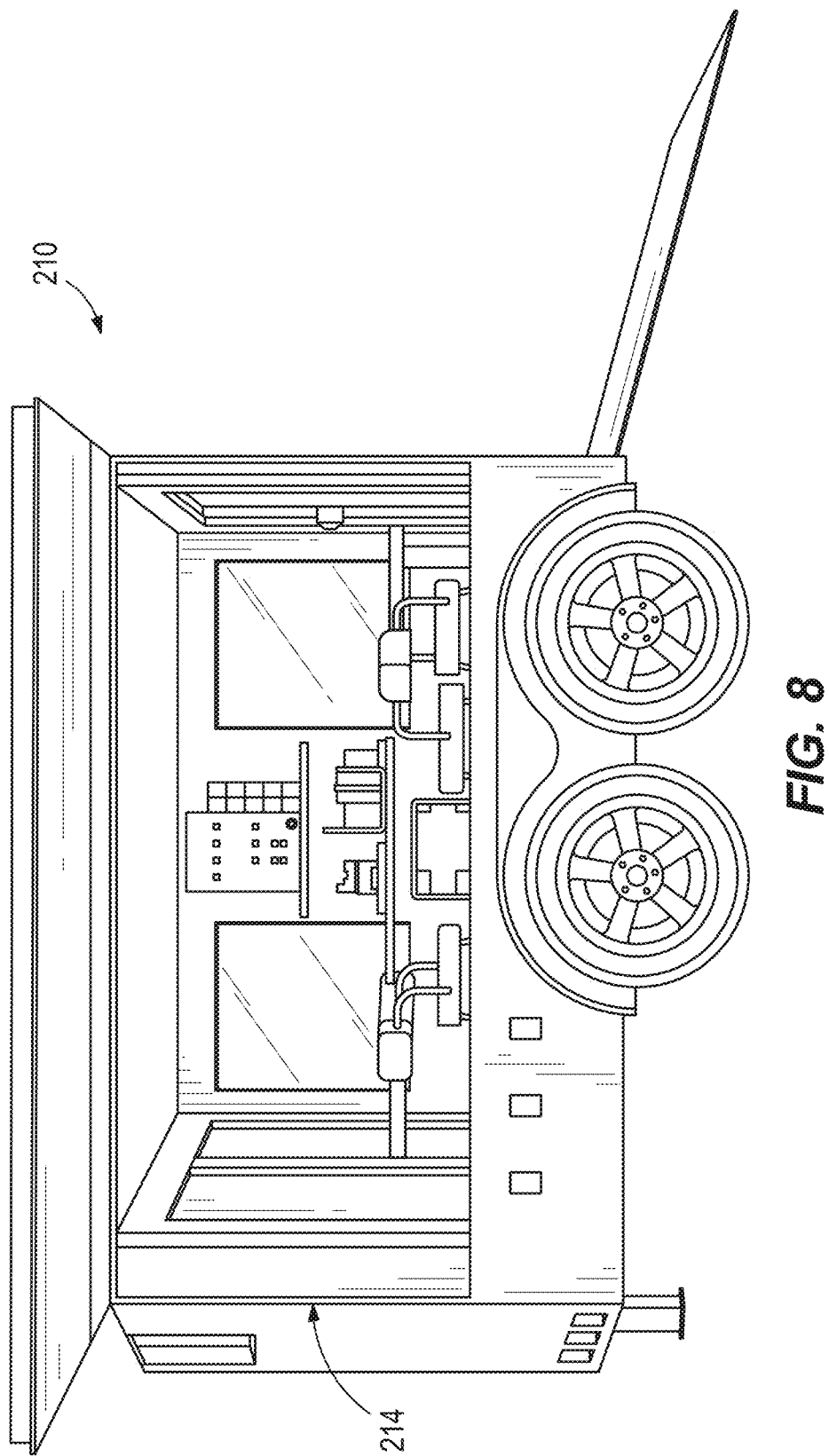
Figure 9:
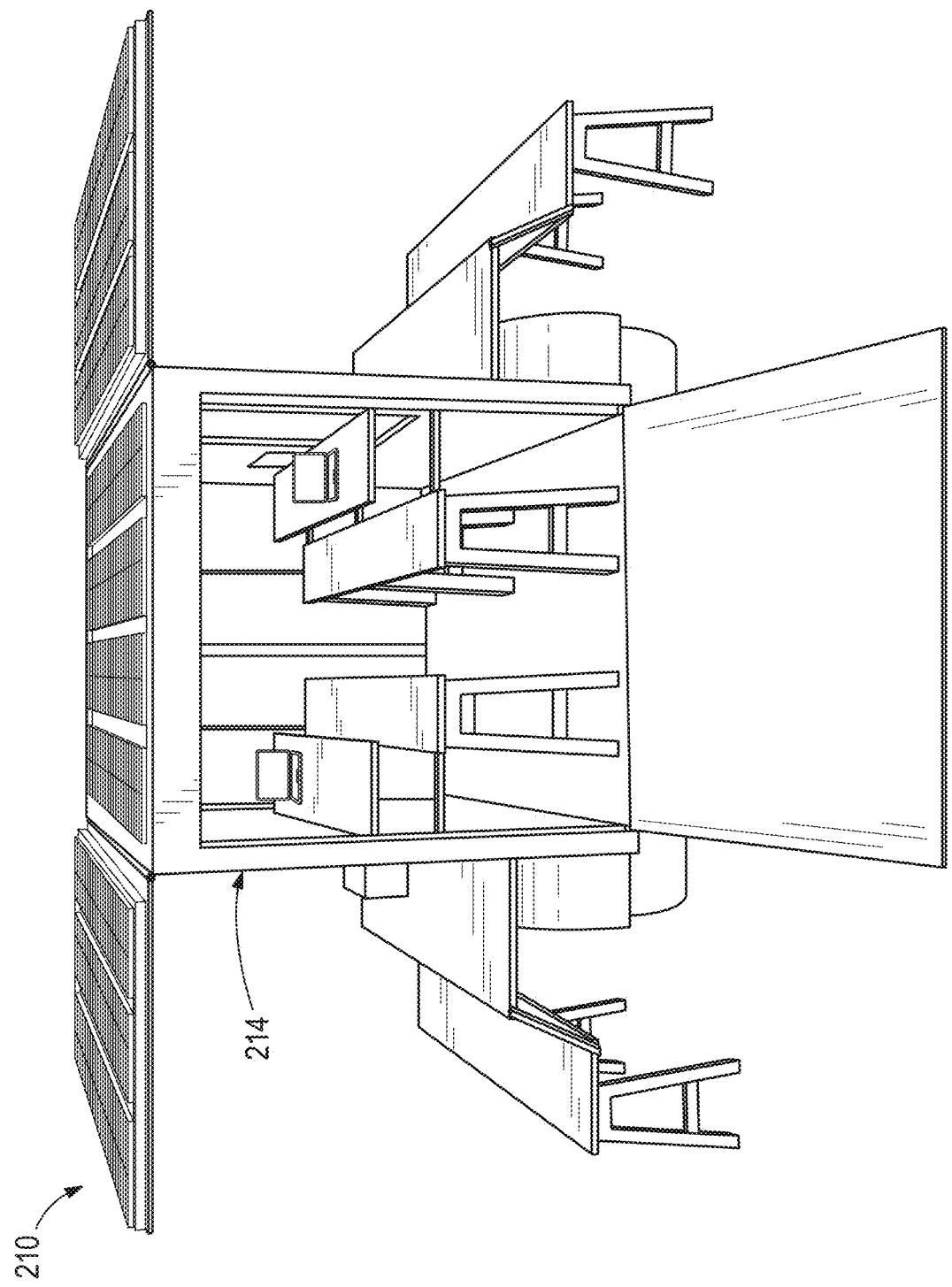

FIGS. 5-9 illustrate other variations of a mobile generator. For example, FIGS. 5 and 6 illustrate a mobile generator 110 that is similar to the mobile generator 10 described above. The mobile generator 110 includes a wheeled housing 114 that is smaller, however, and includes less internal structure than the housing 18 seen for example in FIGS. 1-3. FIGS. 7-9 illustrate a mobile generator 210 that is similar to the mobile generator 10 described above. The mobile generator 210 includes a housing 214, however, having benches or seats that may be folded out or into the housing 214, as well as an office space or workspace available inside the housing 214. As described above, the mobile generators may be used for a variety of different purposes. Accordingly, their housings may be adapted as need to accommodate the different intended purposes.

Overall, the mobile generators described herein may be deployed in an easy-to-use manner, and may be set up for example in less than 15 minutes (times may vary). Deployment of the mobile generator may require little to no training, and the mobile generator may additionally require little to no maintenance throughout its lifetime. In some embodiments, no on-site labor is required for installation at all, and each mobile generator may be pre-configured with an interior standard solution to utilize the energy produced. In other words, each mobile generator may be designed or otherwise used for a particular purpose and energy needed. For example, as described above, the mobile generator may be used for an office, warehouse/storage, refrigerator, medical clinic, pharmacy, water filtration/pumping/air-to-water generation station, retail store, communication center, disaster preparation/recovery office, library, classroom, military equipment, or an electrical vehicle (EV) charging station. In some embodiments, one or more mobile generators may be used to generate off-grid solar power in various settings ranging from weather emergencies, disaster relief, medial aid, and military transport of supplies. The mobile generators may both generate power for immediate use, as well as store power for future use. Other embodiments include different interior standard solutions or uses than those listed.

In some embodiments, the mobile generator 10 may form or otherwise be part of a nanogrid. The mobile generator 10, or the nanogrid of which it is a part, may operate in isolation as an off-grid energy solution, may be connected for example to a main electrical grid, or may have a hybrid use (i.e., both off-grid and grid applications). Additionally, because of the pivoting movement of the energy-generating portions of the mobile generator 10 described above, the solar panels 66 may be securely locked and moved away from the exterior of the mobile generator 10 during non-use to inhibit damage, and may be quickly deployed and used when needed.

Although the invention has been described in detail with reference to certain preferred embodiments, variations and modifications exist within the scope and spirit of one or more independent aspects of the invention as described.

What is claimed is:

1. A mobile generator comprising:
   a housing having a top portion and a side portion, wherein the housing defines an interior;
   an arm pivotally coupled to both the top portion and the side portion;
   an energy-receiving component coupled to the side portion;
   wherein the side portion is movable relative to the housing and the arm between a fully stored state and a fully deployed state, wherein in the fully deployed state the energy-receiving component is configured to be exposed to sunlight, and wherein in the fully stored state the energy-receiving component is configured to face the interior of the housing.

2. The mobile generator of claim 1, wherein the energy-receiving component includes a solar panel.

3. The mobile generator of claim 1, wherein the arm is a first arm, and wherein a second arm is pivotally coupled to the housing.

4. The mobile generator of claim 1, further comprising a trailer, wherein the housing is positioned on the trailer.

5. The mobile generator of claim 4, wherein the trailer includes a hitch and a wheeled flatbed extending from the hitch, wherein the mobile generator is configured to be moved from a first location to a second location via the trailer.

6. The mobile generator of claim 1, wherein the housing has a rectangular box-like structure.

7. The mobile generator of claim 1, wherein the housing includes a front portion that includes at least one electronic component coupled to the energy-receiving component.

8. The mobile generator of claim 1, wherein the arm is configured to be rotated 90 degrees about a first pivot point, and wherein the side portion is configured to be rotated 180 degrees about a second pivot point.

9. The mobile generator of claim 1, wherein a motion controller is coupled to both the housing as well as to the arm, and wherein the arm is configured to be rotated about a pivot point from a first position to a second position when the motion controller is activated.

10. The mobile generator of claim 1, wherein a motion controller is coupled to both the arm as well as to the side portion, and wherein the side portion is configured to be rotated about a pivot point from a first position to a second position when the motion controller is activated.

* * * * *